(No Model.)

V. LAPHAM.
SPRINKLER HEAD FOR AUTOMATIC FIRE EXTINGUISHERS.

No. 575,121. Patented Jan. 12, 1897.

Witnesses:
J. Halpenny.
C. E. Riddelson.

Inventor:
Valentine Lapham
By his attorneys
Gridley & Hopkins

UNITED STATES PATENT OFFICE.

VALENTINE LAPHAM, OF CHICAGO, ILLINOIS.

SPRINKLER-HEAD FOR AUTOMATIC FIRE-EXTINGUISHERS.

SPECIFICATION forming part of Letters Patent No. 575,121, dated January 12, 1897.

Application filed September 7, 1894. Serial No. 522,389. (No model.)

*To all whom it may concern:*

Be it known that I, VALENTINE LAPHAM, a citizen of the United States, residing at Chicago, in the county of Cook and State of Illinois, have invented certain new and useful Improvements in Sprinkler-Heads for Automatic Fire-Extinguishers, of which the following is a specification, reference being had to the accompanying drawings, which are made a part hereof, and in which—

Figure 1:
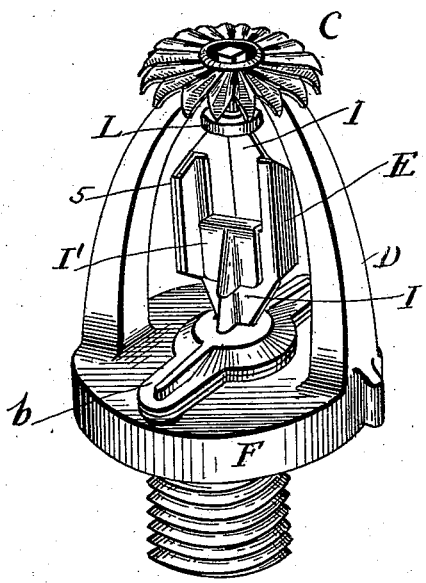
Figure 2:
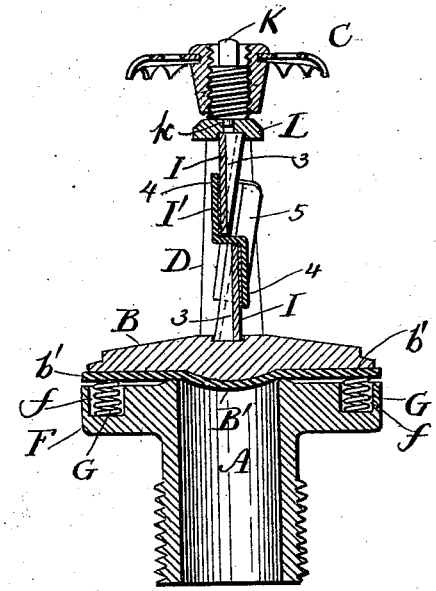
Figure 3:
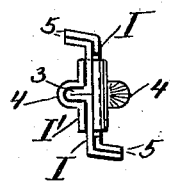
Figure 4:
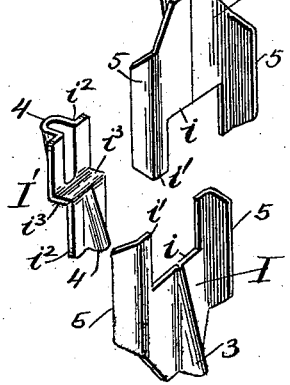
Figure 5:
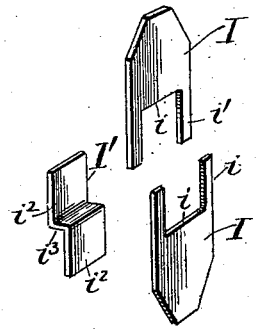
Figure 6:
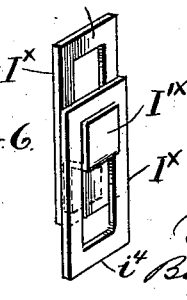

Figure 1 is a perspective view of a sprinkler-head embodying the invention. Fig. 2 is an axial section thereof. Fig. 3 is an end elevation of the strut. Fig. 4 is a perspective view of the parts thereof before they are assembled. Fig. 5 is a similar view of the parts of the strut under a modification. Fig. 6 is a perspective view of a link embodying some features of the invention.

Perfection in a sprinkler-head demands that the instant the head is fired the cap shall be unseated, and, together with the parts that were used for holding it seated, removed from the path of the stream. In fact, the head should be stripped of everything excepting the deflector and the yoke which supports it. To attain this result has been the object of many inventions and is the object of the present invention, which latter consists in the several features of novelty that are particularly pointed out in the claims.

In the drawings, A represents the nozzle of the distributing-pipe; B, the cap for closing it; C, the deflector located directly opposite the nozzle; D, the yoke which supports the deflector and is in turn supported by the nozzle, and E the strut. The nozzle and yoke are preferably an integral casting, and projecting from the nozzle laterally is a flange F, the object of which is to afford a bearing for a spring or springs G, which bear against the under side of the cap (or lugs $b$ projecting therefrom) and tend constantly to throw it from its seat. Preferably a pair of coiled springs are used for this purpose, and in order to prevent their displacement the flange is provided with sockets $f$, in which they fit.

The customary non-metallic packing B' is placed between the cap and its seat, and I prefer to provide this packing with projecting ears $b'$, which correspond in shape and size with the lugs $b$. This gives a non-metallic bearing for the springs and avoids the possibility of their corroding to the cap. These springs are of such length and power that immediately upon the removal of the pressure which holds the cap seated they will throw it off and completely remove it from the path of the stream.

The principal novel feature of the present invention is the strut, which is made up of three pieces, and these in their simplest forms are constructed as shown in Fig. 5. Two of them (those lettered I) are similar in construction. Each of them has in one of its ends a notch, resulting in a shoulder $i$ and two tongues $i'$, and these notches are a trifle wider than the third part I', which latter will be hereinafter called a "rocker." The plate of which this rocker is made is bent twice, the two bends being in opposite directions and practically at right angles to each other, so that when complete the ends $i^2$ of the rocker are in parallel planes, and are united by a shoulder $i^3$, that is at right angles to them. The length of this shoulder is such that the distance between the planes of the near faces of the offset ends $i^2$ is just equal to the aggregate thickness of the two parts I when these latter are placed together, so that when the parts are assembled the offset ends of the rocker will bear flat against the outer faces of the parts I. The parts I are placed together with their tongues presented in opposite directions and overlapping and their shoulders $i$ opposed to each other and bearing against opposite sides of the shoulder of the rocker, the meeting faces of all three parts being soldered together. It will be seen that so long as the ends of the rocker are held against the faces of the parts I the parts of the strut cannot be separated by endwise pressure. The rocker is in effect fulcrumed upon both of the shoulders $j$, and as soon as the rocker is freed from restraint endwise pressure upon said parts I will cause the rocker to move upon these fulcrums and permit the parts I to approach each other; but the distance between these two bearing points or fulcrums of the rocker is very short, and this is tantamount to saying that the lever through which endwise pressure upon the parts I acts upon the rocker is short, very short, in fact, as compared with the lever through which the solder acts upon said rocker in restraining its movement. Hence a small force acting upon the end $i^2$ of the rocker in a direction perpendicular to its plane will suffice to resist a much greater force acting upon the shoulder $i^3$ in a direction perpendicular to the direction of the force first aforesaid.

The only difference between the strut shown in Figs. 1, 2, 3, and 4 and that shown in Fig. 5 is that the former is provided with strengthening ribs and flanges and the latter is not. Preferably each of the parts I is provided with a central corrugation or rib 3, and each end of the rocker is provided with a corresponding corrugation 4 for receiving it. The corrugations or ribs 3 extend quite to the ends of the strut, and the advantage of this is that it gives a T-shaped bearing. Each of the parts I is provided also, at each of its edges, with a strengthening-flange 5, and these flanges not only strengthen the strut, but act as guides and aid materially in assembling the parts. The same principle as is embodied in this strut may be embodied in a link, or, in other words, a device for resisting tensile strains, as shown in Fig. 6, where $I^\times$ indicates two parts, corresponding to the parts I, and $I'^\times$ indicates a rocker similar in construction and operation to the rocker I'. The only difference between these two elements is that in the one shown in Figs. 1, 2, 3, 4, and 5 the tongues $i'$ of one part do not extend completely beyond the other part, while in the one shown in Fig. 6 they do, and are connected by cross-pieces $i^4$ to afford bearings for the parts over which the link is hooked.

Instead of causing the clamping-screw K to bear directly against the end of the strut I interpose between them a displaceable block L, which has a depression corresponding in shape to the shape of the end of the strut and a central perforation for receiving loosely a pin or stud $k$, projecting from the end of the screw. This construction relieves the strut of much of the torsional strain that would come upon it while the head is being set, if it were not for the block L.

Having thus described my invention, the following is what I claim as new therein and desire to secure by Letters Patent:

1. As a new article of manufacture, an element for sprinkler-heads having in combination a rocker having offset ends and two parts bearing in opposite directions against the intermediate portion of the rocker, one of said parts being soldered against the inner face of each of the offset ends of the rocker and both of said parts being cut away sufficiently to permit them and the offset ends of the rocker to pass, substantially as set forth.

2. As a new article of manufacture, an element for sprinkler-heads, having in combination, two overlapping parts cut away to form opposing shoulders, and a rocker having an offset, the rocker having its offset ends secured against the outer faces of the parts first aforesaid, and having its intermediate portion arranged between the shoulders of said parts, substantially as set forth.

3. As a new article of manufacture, an element for sprinkler-heads having in combination a rocker, and two parts bearing in opposite directions against said rocker, said parts being soldered together and to the rocker and provided with overlapping marginal flanges; substantially as set forth.

4. As a new article of manufacture, an element for sprinkler-heads having in combination a rocker, and two parts bearing in opposite directions against said rocker, said parts and rocker being provided with complementary corrugations and soldered together; substantially as set forth.

5. As a new article of manufacture a strut for sprinkler-heads, having in combination two parts cut away to form opposing shoulders, and overlapping tongues, a rocker having a part occupying said cut-away portions and affording bearings for said shoulders, and having also parts secured against the outer faces of the parts first aforesaid, said parts first aforesaid having at their edges overlapping flanges for strengthening them, and guiding them, while being assembled, substantially as set forth.

6. As a new article of manufacture a strut for sprinkler-heads, having, in combination, two parts cut away to form opposing shoulders and overlapping tongues, a rocker having a part occupying said cut-away portions and affording bearings for said shoulders, and having also parts secured against the outer faces of the parts first aforesaid, said parts first aforesaid and the rocker having complementary corrugations, substantially as set forth.

VALENTINE LAPHAM.

Witnesses:
C. FRED GATES,
F. F. ROZIER.